June 9, 1959 — C. H. HOLSCLAW — 2,889,945
BOAT TRAILER CONSTRUCTION
Filed Dec. 23, 1954
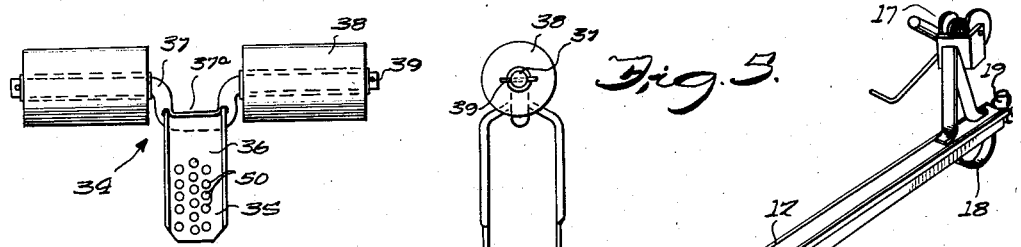
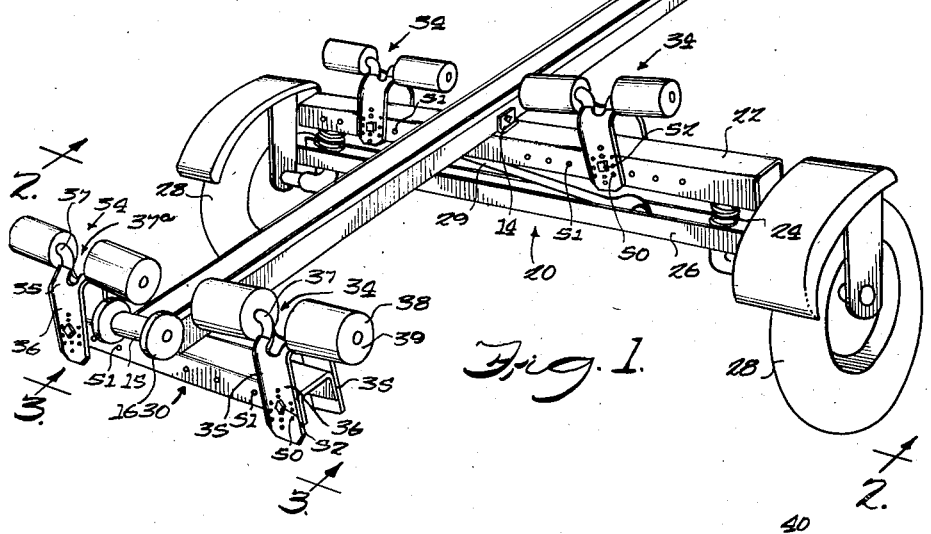
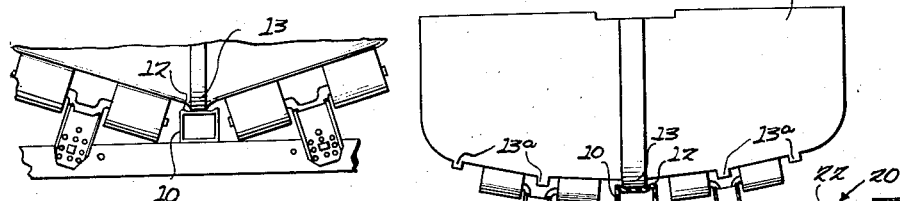
Inventor
Charles H. Holsclaw
by Carlson, Pitzner, Hubbard & Wolfe
Attorneys United States Patent Office  
2,889,945  
Patented June 9, 1959

2,889,945
BOAT TRAILER CONSTRUCTION
Charles H. Holsclaw, Evansville, Ind.

Application December 23, 1954, Serial No. 477,353

6 Claims. (Cl. 214—84)

The present invention relates to boat trailers, and more particularly to a combination of elements on such a trailer for loading and launching a carried boat. The invention finds particular, although not exclusive, utility in carrying small boats having a main keel and two or more auxiliary keels.

A general object of the present invention is to provide a boat trailer with boat-supporting members which facilitate easy loading and unloading of a wide variety of small boats.

A more specific object of the present invention is to provide a boat trailer with rubber rollers capable of automatically pivoting to accommodate the bottom configuration of any small boat.

It is a further object relative to the foregoing to provide a roller support for a boat bottom which is so mounted and arranged as to accommodate itself freely to the varying bottom configuration from one end of the boat to the other.

Another object of the invention is to provide a rubber roller assembly mounted upon a boat trailer which is not only pivotable but is adaptable for vertical or lateral adjustment upon a trailer frame for accommodation of variously sized boat bottoms.

It is an auxiliary object of the present invention to provide a boat trailer having a rubber roller assembly which assembly includes a U-shaped cross member adapted for supporting the bottom of a boat and at the same time providing maximum clearance for the often fragile auxiliary keels found on the bottom surface of many small boats. Still another object of the invention is to provide a T-shaped yoke for a roller type boat supporting assembly which yoke includes a vertical portion having a channel-like cross section for withstanding the compressive boat-supporting forces to which it is subjected.

Other objects and advantages will become apparent from the attached detailed description and upon reference to the drawings, in which:

Figure 1 is a perspective view from the rear of a boat trailer illustrative of one embodiment of the present invention.

Fig. 2 is a section of the boat trailer with a boat mounted thereon taken along the line 2—2 of Fig. 1.

Fig. 3 is a section of the boat trailer with a boat mounted thereon taken along the line 3—3 of Fig. 1.

Fig. 4 is a plan view of a typical bracket and roller assembly for contacting the bottom of a boat.

Fig. 5 is an elevation of the bracket and roller assembly shown in Fig. 4.

Turning now to the drawings, Fig. 1 shows a boat trailer comprising a longitudinal keel runner 10, a transverse wheel mounted saddle assembly 20 for mounting the keel runner 10, and a transverse transom support assembly 30 mounted at the rear end of the runner 10. As shown in Fig. 2, a boat 40 is normally supported in a horizontal position upon the boat trailer by the saddle assembly 20 and the transom support assembly 30 (shown in Fig. 1).

The longitudinal runner 10 has a generally box-shaped cross section and the top surface of the runner has been provided with upturned longitudinal edges 12 which serve to guide a main boat keel 13 into a load supporting position upon the runner. Clamping pieces 14 are provided on either side of the runner 10 for securing the runner to the transverse top member 22 of the saddle assembly 20.

Attention is drawn to the fact that modern boat hulls often include longitudinally auxiliary boat keels 13a spaced across the bottom of the boat 40 on either side of the main keel 13. Such auxiliary keels serve as directional stabilizers for facilitating high speed boat maneuvers without an undue amount of skidding.

As will be hereafter described in more detail, a loading roller 15 journaled in spaced bearings 16 is provided at the extreme rear end of the runner 10, the bearings being affixed thereto. Secured to the extreme front end of the runner 10 at the top thereof is a winch assembly 17 for use in cooperation with the loading roller 15 in loading the boat 40 onto the boat trailer. Also provided at the forward end of the runner 10 is a curved combination skid and guiding handle 18 mounted beneath the runner to facilitate manual movement of the boat trailer as well as to serve as a striking surface when the runner 10 tips forwardly and to the ground. A trailer coupling 19 is provided at the extreme forward end of the runner 10 to permit an attachment of the boat trailer to an automobile or other prime mover.

The wheel mounted saddle assembly 20 which supports the runner 10 near the mid portion thereof and in transverse relationship thereto, comprises a channel-shaped top member 22 supported by means of springs 24 which in turn rest upon an axle or lower member of the saddle assembly 26 which is spaced from and parallel to the top member. Independently mounted wheels 28 support the members 22 and 26 and are rotatable about the axle 26. A bar 29 is diagonally transposed between one end of the axle 26 and the opposite end of the upper member 22 to produce a stabilizing effect.

For the purpose of supporting the transom of the boat 40, the support assembly 30 is provided at the extreme rear end of the runner 10. Such assembly has a transverse supporting channel 32 secured thereto which channel is short in length as compared with the members 22 and 26 of the saddle assembly 20.

In accordance with the present invention, I provide T-shaped adjustable roller assemblies 34 spaced on either side of the keel runner 10 and upstandingly secured to the top member 22 of the saddle assembly 20 and to the channel 32 of the transom assembly 30 for engaging the middle and rear end portions, respectively, of a boat bottom. Each roller assembly 34 includes a yoke 35 having a vertical strap or bracket portion 36 and a lateral cross member or axle 37.

The cross member 37 is downwardly offset at its central portion 37a for providing maximum clearance for one of the relatively fragile auxiliary keels 13a which is adjacent the main keel 13. A pair of rollers 38, preferably fashioned from rubber, are journaled on the ends of the cross member 37 and spaced on either side of the depressed portion 37a for contacting the bottom of the boat 40. Cotter keys 39, provided in each of the extreme ends of the cross member 37, retain the rollers 38 in place upon the cross member and also facilitate removal of such rollers for repair or replacement.

As will be seen from the drawings, the strap or vertical portion 36 of the yoke 35 is formed in a channel shape to impart compressive strength to the assembly 34. Another advantage of the channel-shaped strap 36 is that such construction provides a large area for welding the strap to the cross member 37 as will be evident from an inspection of Fig. 4.

For the purpose of adapting the roller assembly 34 to fit the bottom of any small boat, the lower end of the strap 36 is provided with a pattern of staggered holes 50 for alinement with another series of holes 51 provided in the lateral edges of the top member 22 and the supporting channel 32. Upon alinement of the holes 50, 51, a fastener 52, such as a bolt, may be inserted through such alined passage and there fastened by means of a nut or the like for retaining the roller assembly 34 in the desired position. The varied pattern and large number of holes 50, 51 permits an adjustment of the roller assembly 34 laterally, vertically, and rotatably about an axis through the fastener 52 so that the assembly 34 can be adapted to fit the bottom of any boat.

Having observed the details of the invention, attention may now be given to the operation of the novel construction. In loading a boat 40 from the water onto the boat trailer, an operator grasps the skid and guiding handle 18 at the extreme forward end of the runner 10 and thereby tilts this end of the runner upwardly so that the loading roller 15 rests upon the ground. The operator then backs the boat trailer into the water until the loading roller 15 is in a position just beneath the bow of the boat. Upon securing a rope from the winch assembly 17 to the bow of the boat and winding the same about the winch, the bow of the boat will be pulled axially across the loading roller 15, and in succession across the roller assemblies 34, supported on the channel 32 and on the member 22 of the saddle assembly 20. Accordingly, when the boat is in final position upon the boat trailer, the bow of the boat is resting adjacent to the winch assembly 17 and the transom portion of the stern of the boat is resting directly over and is supported by the roller assemblies 34 affixed to the supporting channel 32. Thus, in final position, the keel 13 of the boat 40 rests securely between the guide edges 12 of the runner 10 and the middle and rear portions of the bottom of the boat are supported by the roller assemblies 34.

Unloading the boat from the boat trailer is substantially the reverse of the above procedure. During the unloading operation the winch assembly 17 functions as a brake to permit controlled launching of the boat.

One of the features of the invention lies in the provision of separate roller assemblies for carrying the transom of the boat. This is particularly important since power boats today frequently employ outboard motors which are left in place upon the boat transom in transport. The boat and motor together may weight between twelve and eighteen hundred pounds, which weight is effectively increased when striking a bump in the highway. Thus a provision of separate transom supports serves to balance the load over the entire boat trailer.

One of the advantages of the inventive roller assemblies 34 lies in the pivot arrangement provided in the lower section of the strap 36. A rockable T assembly is here produced which is capable of accommodating itself to the angle of the underside of any small boat. Additionally, since the line of compressive force is through the supporting fastener 52, all twisting forces which might otherwise be exerted upon the cross member 37 are eliminated.

I claim as my invention:

1. In a trailer for carrying a boat having a main keel and auxiliary keels laterally spaced over the bottom thereof, the combination comprising a longitudinal central member adapted to receive the main keel; a transverse wheel mounted saddle assembly for supporting said member near the midpoint thereof and for effecting tilting movement of said member about said assembly; and a pair of roller assemblies spaced on either side of said central member and adjustably supported on said saddle assembly, said roller assemblies each comprising an axle having a downwardly offset central portion for receiving one of the auxiliary keels and a pair of rollers journaled on the ends thereof, and a pair of parallel channel-shaped straps affixed at their upper ends to said central portion at a point below the axis of said rollers and pivotally connected at their lower ends to said saddle assembly.

2. In a trailer for carrying a boat having a main keel and auxiliary keels laterally spaced on the underside thereof and having a longitudinal central member adapted for reception of the main keel, a transverse piece for supporting said boat, and a roller assembly adjustably mounted on said piece and arranged to provide an opening therein for reception of one of the auxiliary boat keels, said assembly comprising a vertically disposed bracket, means for pivoting the lower end of said bracket on said piece, and a roller of rubber or the like carried by the upper end of said bracket for engaging the bottom of said boat.

3. A trailer for carrying a boat, comprising a longitudinal central member for supporting the boat keel, a transverse saddle assembly for supporting said member near the midpoint thereof, a second member transversely affixed to one end of said central member for supporting the stern of said boat, pivoted roller assemblies mounted on said saddle assembly and said second member for receiving and supporting the underside of the boat and arranged to provide openings therein for reception of the auxiliary boat keels, each of said roller assemblies including a vertically disposed bracket, and means for pivoting the lower ends of each of said brackets for adjustably effecting accommodation of said roller assemblies to variously contoured boat bottoms.

4. In a trailer for carrying a boat having a main keel and auxiliary keels laterally spaced over the boat bottom, the combination comprising a longitudinal central member adapted to receive the main keel, a transverse keel mounted saddle assembly for supporting said member near the midpoint thereof and for effecting tilting movement of said member about said assembly, a top member of said assembly having vertical side pieces provided with a series of alined holes, brackets having a pattern of spaced bolt holes in their lower ends for alinement with said series and carrying a pair of rubber rollers on their upper ends for engaging the bottom of the boat, each pair of said rubber rollers being axially spaced apart for receiving respective ones of the auxiliary keels therebetween and a fastener for insertion through the alined holes of said bracket and said top member for positioning said rollers at a desired height and at a desired lateral position to accommodate the auxiliary keels whereby the brackets are pivotally mounted on said top member.

5. In a trailer for carrying a boat having a main keel and auxiliary keels laterally spaced on the underside thereof and having a longitudinal central member adapted for reception of the main keel, a transverse piece for supporting said boat, and a pair of roller assemblies arranged on either side of said member and adjustably mounted on said piece, each of said assemblies comprising a vertically disposed bracket having a downwardly offset portion in the upper end thereof for accommodating one of the auxiliary keels, means for pivoting the lower end of said bracket to said piece, and a pair of spaced rollers carried by the upper end of said bracket adjacent to said offset portion for engaging the bottom of said boat.

6. In a trailer for carrying a boat having a main keel and auxiliary keels spaced over the bottom thereof, the combination comprising a longitudinal central member, a transverse wheel mounted saddle assembly for supporting said member near the midpoint thereof, a second member transversely affixed to one end of said central member, said assembly and said second member being arranged to support the midportion and transom of the boat, respectively, a plurality of pivoted roller assemblies associated with said saddle assembly and said second member for engaging the underside of the boat, each of said roller assemblies arranged to provide an opening therein for reception of one of the auxiliary boat keels, and means for pivoting the lower ends of said roller assemblies for adjustably effecting accommodation of variously contoured boat bottoms.

References Cited in the file of this patent

UNITED STATES PATENTS

| | | |
|---|---|---|
| 1,077,540 | McCurdy | Nov. 4, 1913 |
| 1,534,334 | Stutsman | Apr. 21, 1925 |
| 2,049,968 | Mead | Aug. 4, 1936 |
| 2,174,063 | Richards | Sept. 26, 1939 |
| 2,405,810 | Berg et al. | Aug. 13, 1946 |
| 2,554,398 | Brei | May 22, 1951 |
| 2,608,314 | Krider | Aug. 26, 1952 |
| 2,636,745 | Cartwright | Apr. 28, 1953 |
| 2,650,099 | Keaton | Aug. 25, 1953 |
| 2,676,716 | Sallis | Apr. 27, 1954 |
| 2,691,534 | Sampsell | Oct. 12, 1954 |
| 2,713,951 | Davies | July 26, 1955 |
| 2,733,823 | Evans | Feb. 7, 1956 |

FOREIGN PATENTS

| | | |
|---|---|---|
| 10,667 | Great Britain | May 6, 1912 |